United States Patent [19]
Hua

[11] Patent Number: 6,005,780
[45] Date of Patent: Dec. 21, 1999

[54] SINGLE-STAGE AC/DC CONVERSION WITH PFC-TAPPED TRANSFORMERS

[76] Inventor: Guichao Hua, 402 Algonquin Ct., Blacksburg, Va. 24060

[21] Appl. No.: 08/921,171

[22] Filed: Aug. 29, 1997

[51] Int. Cl.[6] .................................................. H02M 3/335
[52] U.S. Cl. .............................................. 363/20; 363/131
[58] Field of Search ................................. 363/17, 20, 21, 363/39, 40, 131

[56] References Cited

U.S. PATENT DOCUMENTS

| | | | |
|---|---|---|---|
| 4,607,319 | 8/1986 | Assow et al. | 363/20 |
| 5,331,534 | 7/1994 | Suzuki et al. | 363/20 |
| 5,600,546 | 2/1997 | Ho et al. | 363/21 |
| 5,652,700 | 7/1997 | Tsai et al. | 363/21 |
| 5,673,184 | 9/1997 | Rilly et al. | 363/21 |
| 5,790,389 | 8/1998 | Hua | 363/20 |

*Primary Examiner*—Adolf Deneke Berhane
*Attorney, Agent, or Firm*—Charles A. McClure

[57] ABSTRACT

Improved AC/DC conversion in power supplies having an isolation transformer located between rectified-AC input and DC output leads. The transformer is given a primary winding having one or more taps, and a positive input lead is connected thereto by a corresponding number of intermediate leads, each containing selected components. The improvement not only enables power factor correction (PFC) but also desired adjustment of or control over other operational variables, such as bulk capacitor voltage stress, output regulation, and overall efficiency, often at a reduction in circuit complexity and cost.

21 Claims, 8 Drawing Sheets

SINGLE-STAGE AC/DC CONVERSION WITH PFC-TAPPED TRANSFORMERS

TECHNICAL FIELD

This invention relates to AC/DC converters improved with at least one so-called PFC (power factor correction) lead to at least one primary winding tap of an isolation transformer located between circuitry for rectifying input AC and circuitry for outputting DC.

BACKGROUND OF THE INVENTION

Conventional methods of adequate power factor correction (PFC), especially for consolidated (single-stage) AC/DC converters, include contributions described in U.S. patents and/or in technical reports.

Notable patented examples include the following: "Single Conversion Power Factor Correction Using SEPIC Converter" by Fraidlin, Slack and Wadlington in U.S. Pat. No. 5,115,185 (1992)—good power factor but low-frequency ripple in output voltage and slow transient response; also "High Power Factor AC/DC Converter" by Teramoto, Sekine, and Saito in U.S. Pat. No. 5,301,095 (1994)—a PFC corrective design with a sole high-frequency capacitor, but the primary diode undergoes hard switching unsuited to high-frequency operation, while input and load ranges are narrow in the absence of extensive frequency modulation; and, more recently, "Input Harmonic Current Corrected AC-to-DC Converter with Multiple-Coupled Primary Windings" by Ho and Lee in U.S. Pat. No. 5,600,546 (1997)—a single-stage PFC AC/DC converter with one power switch and one magnetic component, its energy-storage capacitor so highly voltage-stressed as to limit power factor to about 0.8, and pulsating input with high switching AC ripple requiring optimal EMI filtration, and with the switching diode undergoing hard switching.

Notable examples of contributions to the technical literature include "Integrated High Quality Rectifier-Regulators" by Madigan, Erickson, and Ismail in their 1992 PESC Record article describing so-called BIFRED (and BIBRED)—designs of very good power factor and regulation, but not so good efficiency, and also nearly as bulky as earlier designs; also "A New Family of Single-Stage Power-Factor Correctors with Fast Regulation of the Output Voltage" by Redl, Balogh, and Sokal in their 1994 PESC Record article—teaching PFC correction with a sole diode, but imposing high switching stresses because of deep discontinuous conduction and requiring a large EMI filter, very bulky; and also, more recently, "Single-Stage Single-Switch Isolated Power Supply Technique with Input-Current Shaping and Fast Output-Voltage Regulation for Universal Input-Voltage-Range Operations" by Huber and Jovanovic in their 1997 APEC Proceedings IEEE article—describing a converter reasonably capable of 0.9 power factor and 400 V capacitors but requiring a complicated power transformer, with at least three primary windings, heavily dependent upon transformer leakage inductance, very resistant to adequate control.

My present invention relies heavily upon reduction in number of components via intermediate tapping of transformer primary windings.

SUMMARY OF THE INVENTION

A primary object of this present invention is to simplify PFC (power factor correction) in single-stage AC/DC converter circuitry.

Another object of this invention is to enhance the topologies of PFC AC/DC soft-switching converters, as used in power supplies.

A further object of the invention is to improve operation of various single-stage AC/DC converters via transformer primary taps.

Yet another object is to enable suitable optimization of AC/DC converter circuitry to meet varied goals of power factor correction, output regulation, overall efficiency, and related indexes of merit.

A still further object is to economize in both number and cost of circuit elements or components used according to this invention.

In general, the objects of this invention are accomplished, in an AC/DC power supply, by connecting at least one PFC lead from a junction with a rectified-AC positive lead to a primary winding of an isolation transformer located between the AC-rectification input circuitry and DC-conversion output circuitry. Such a PFC lead from such positive lead preferably contains a diode in series with a high-frequency inductor. At least one such lead connects to a tap intermediate the ends of the winding. Varying tap location on the winding enables adjustment or optimization of operational variables.

The transformer primary winding itself is also connected to a power switch controlled to function as a high-frequency AC voltage source. The series-connected switch and primary winding are bridged together as a unit by a smoothing (bulk or energy-storage) capacitor connected from a negative (or neutral) rectified-AC input line to the top (high end) of the same primary winding.

A secondary winding of the transformer connects to DC-conversion output circuitry, which may be of substantially any known conventional type, such as boost, buck, buck-boost, Cuk, flyback, forward, SEPIC, or Zeta, for example.

Other objects of this invention, together with methods and means for attaining the various objects, will become apparent from the following description and the accompanying diagrams of at least one embodiment, presented by way of example rather than limitation.

DESCRIPTION OF THE INVENTION

Figure 1:
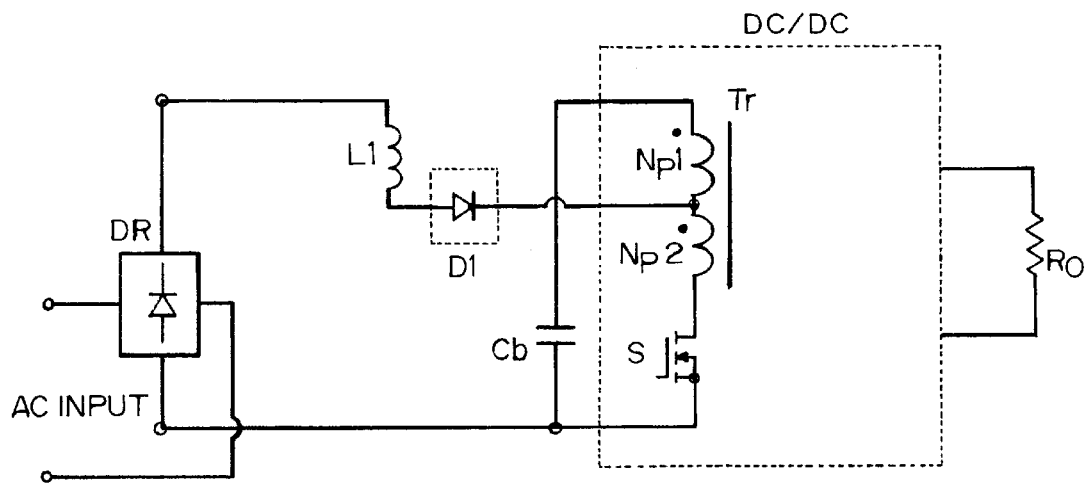
FIG. 1 is a schematic circuit diagram of a single-stage AC/DC converter of this invention represented in generalized form.

FIG. 1 shows, in schematic circuitry diagram form, generalized single-stage AC/DC converter of my design, wherein the intermediate (or PFC) lead is connected to a primary winding tap of an isolation transformer Tr. Such showing includes DR rectifier circuitry at the left, with its positive and negative (or neutral) output lead pair proceeding rightward. The positive lead contains inductor L1, then diode D1, then connects to the designated tap on a tapped primary winding of transformer Tr, the winding having $N_{P1}$ turns in its upper part and $N_{P2}$ turns in its lower part. Energy-storage (bulk or smoothing) capacitor Cb connects between the high end of the primary winding and the negative lead, whereas high-frequency power switch S connects between the negative lead and the low end of the primary winding. At the far right, output resistor Ro represents an external electrical load for the power supply, whereas other parts of the DC/DC conversion circuitry are omitted to simplify the illustration. Although elimination of diode D1 would aid overall efficiency by reducing conduction loss, in practice D1 often is essential to preclude a severe reverse-recovery problem where the rectifying diodes in bridge DR are slow and/or where capacitors are used after the bridge to reduce EMI (electromagnetic interference). For this embodiment the bridge preferably has two fast-rectifying diodes. Any EMI capacitors should be inserted ahead of the bridge.

Figure 2:
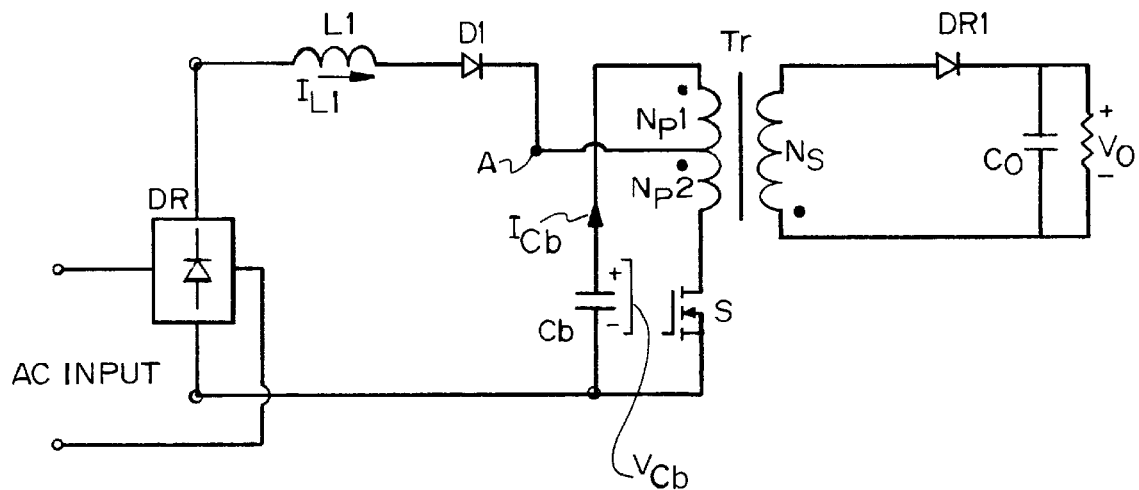
FIG. 2 is a specific flyback embodiment of the FIG. 2 circuit.

FIG. 2 is a more detailed example of the first embodiment of this invention in flyback converter form. If capacitor $C_b$ is large enough so that its voltage $V_{Cb}$ is equivalent to a constant-voltage source having a value exceeding the peak line voltage, L1 functions in discontinuous conduction mode (DCM).

When in DCM, the converter has two operating modes depending upon instantaneous line voltage $V_{In}$. Mode I occurs when $V_{In}$ is less than $(N_{P2}/N_P)V_{Cb}$ (noting that $N_P = N_{P1} + N_{P2}$), whereas Mode II occurs whenever $V_{In}$ is greater than $(N_{P2}/N_P)V_{Cb}$.

During Mode I, the actual voltage at point A always exceeds line voltage, so D1 is reverse-biased, and no current flows through L1—much as in a conventional flyback converter; but in Mode II the converter draws current from the rectified AC source so the operation differs a bit.

Figure 3:
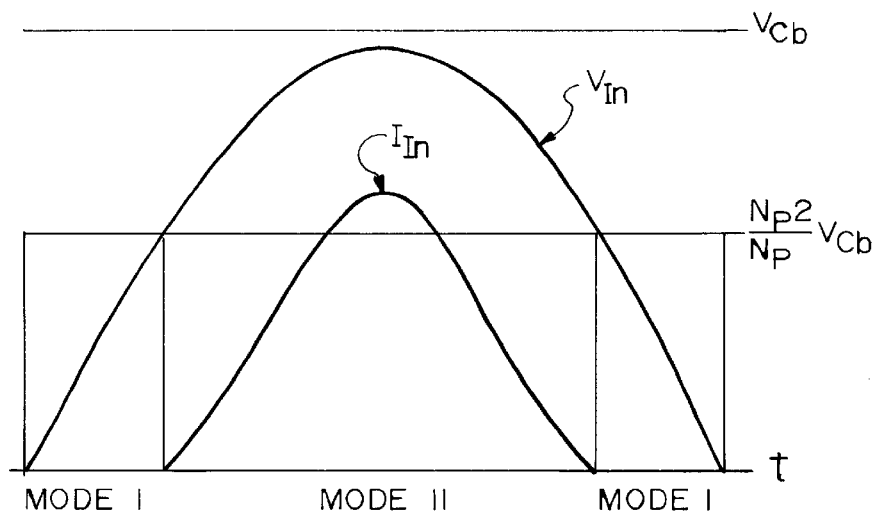
FIG. 3 is a time graph of typical line voltage and average line current waveforms of the FIG. 2 embodiment.

FIG. 3 shows graphically the resulting operation. Mode I gives way to Mode II when the line voltage exceeds the tapped voltage and resumes only when the line voltage subsequently falls below the tapped voltage. The line current ($I_{In}$) is apparent in Mode II.

Figure 4:
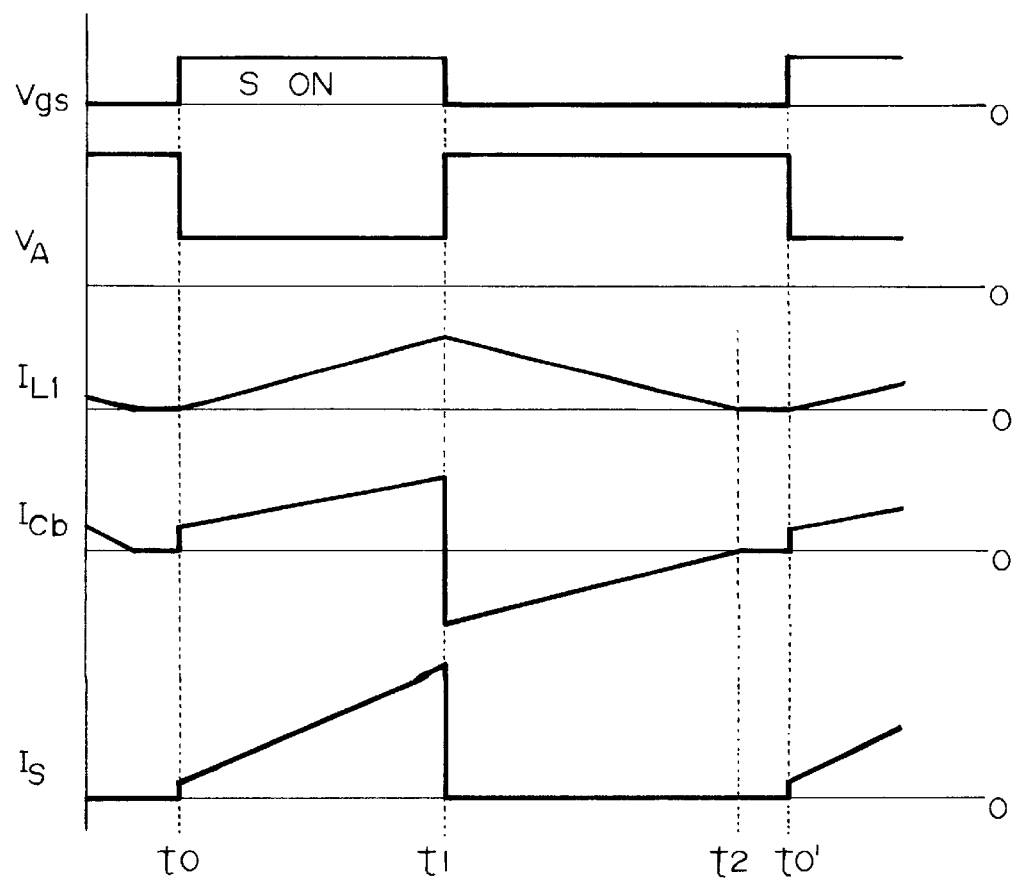
FIG. 4 is a time graph of various internal operating voltages and currents in the same embodiment under FIG. 3 DCM conditions.

FIG. 4 shows graphically the three topological states occurring in each switching cycle, designated by times t0, t1, t2; t0' (etc.).

[t0–t1] Power switch S is ON during this interval, as noted and as indicated by the $V_{gs}$ increase to a given higher value (S ON). $V_A$, the voltage at point A equals $(N_{P2}/N_P)V_{Cb}$—whereupon the L1 current increases at a rate equal to $[V_{in} - (N_{P2}/N_P)V_{Cb})]/L1$. The flyback transformer is charged by both the Cb voltage and the input line voltage.

[t1–t2] Power switch S turns off at time t1, and diode DR1 in series with secondary winding $N_S$ conducts. The voltage at A is clamped to $[V_{Cb} + (N_{P1}/N_S)V_o]$—whereupon the L1 current decreases at a rate equal to $[V_{Cb} + (N_{P1}/N_S)V_o - V_{In}]/L1$. During this interval Cb is charged by the L1 current. If the flyback transformer operates in CCM, the voltage at point A remains unchanged during OFF time.

[t2–t0'] When t2 is reached, D1 current (marked $I_{L1}$) becomes zero and D1 becomes reverse-biased. The rectifier is thus shown to operate with zero-current switching. The transformer continues to deliver energy to the output load (Ro—shown previously). At time t0', switch S turns on again, and a new cycle occurs likewise.

The foregoing analysis assumes that smoothing capacitor Cb is large enough to be considered an ideal DC voltage source without line frequency ripple, but a real capacitor will have significant ripple, and its voltage will equal the rectified line voltage at about the line peak level. Consequently, the converter has another operating mode during which L1 operates in CCM during part of a line cycle.

Figure 5A:
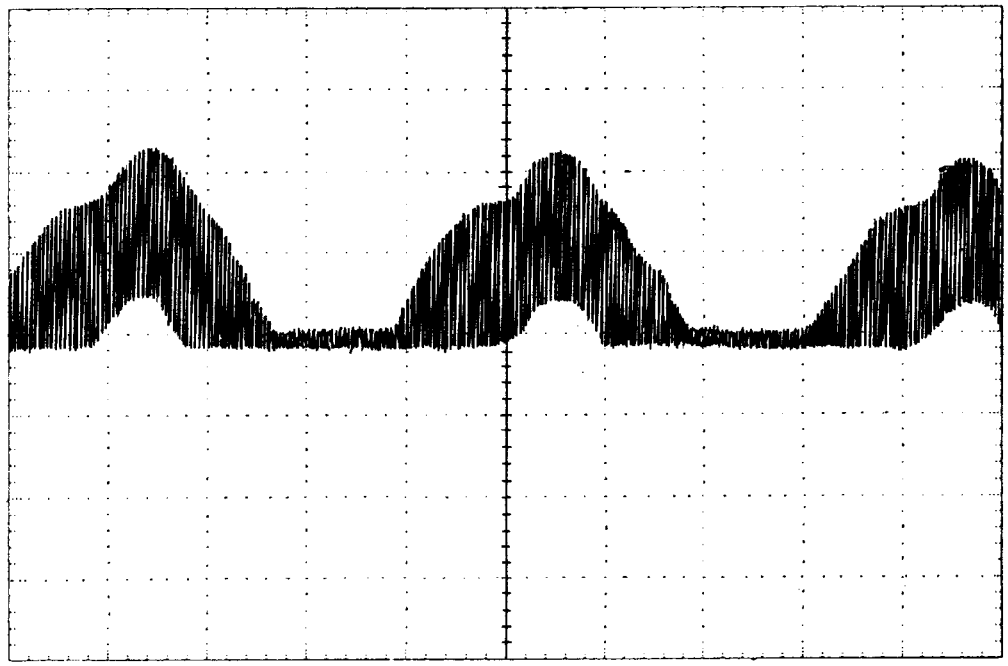
FIG. 5A is a time graph of the current waveform in inductor L1 for a specific embodiment according to FIG. 3A at full load.
Figure 5B:
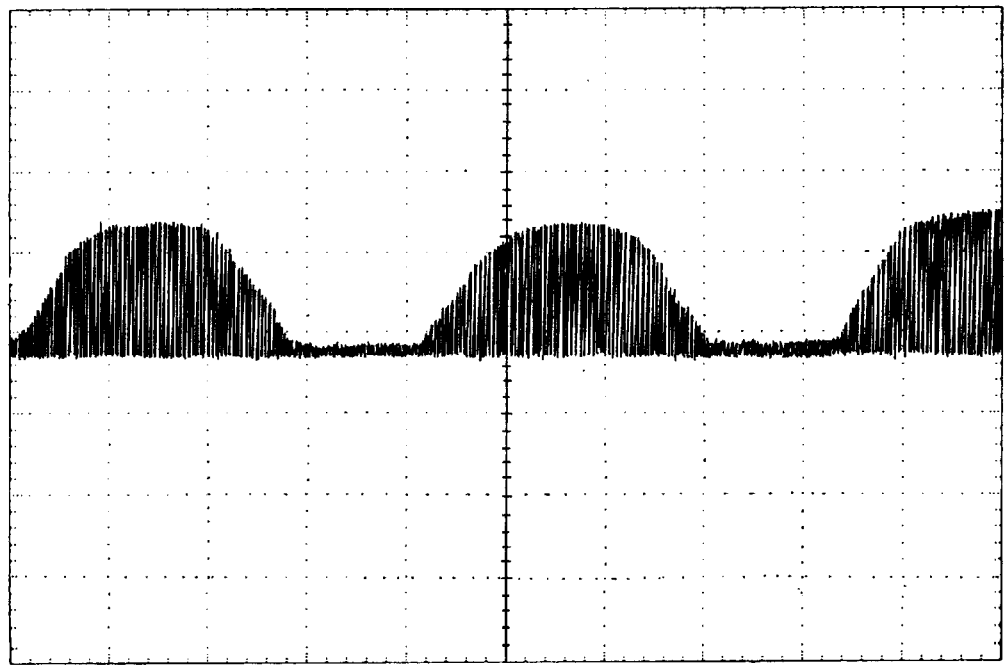
FIG. 5B is a time graph of the current waveform in inductor L1 for the FIG. 5A specific embodiment operating at only half load.

FIGS. 5A and 5B show representative wave-forms experimentally obtained for a particular 65 W (19 V, 3.4 A) converter according to FIG. 3A operating at full load and at half load, respectively.

The main circuit elements of such converter have the following values: S, IRF740; L1, 170uH; Cb, 150uF/200 V; $N_{P1}:N_P=1:2$; $N_P:N_S=5:1$; D1, UES306; and DR1, 16CTQ100.

From these diagrams (FIGS. 5A and 5B) it is apparent that L1 operates in CCM at full load when the line voltage is near its peak. As the load current decreases, the Cb voltage increases, and L1 operates in DCM whenever current is being drawn from the input.

Using simple fixed-frequency control (fs=100 kHz), the converter tightly regulates the output voltage from no load to full load over the entire input range. Over the line and load range, the maximum voltage on Cb, occurring at high line and about half load, is 192 V. At full load and 115 VAC out, measured efficiency is 90%, and power factor is 0.87—fine for single-stage PFC converters.

Another like converter was tested with a 90–264 VAC (universal) input range, and these values: S, IRFPC40; L1, 183uH; Cb, 150uF/400 V; $N_{P1}:N_P=28:55$; $N_P:N_S=55:9$; D1, UES306; and DR1, 16CTQ100. At full load, measured power factors at 115 and 230 VAC, respectively, were 87.5% and 88.5%. The maximum voltage stress on Cb (which occurs at 264 VAC input and 0.5% load) is only about 382 V.

For a given $N_{P1}/N_P$ ratio, when the L1 value increases, the efficiency increases, the bulk capacitor voltage and input switching current ripple decrease, while the power factor decreases, For a given L1 value, a larger $N_{P1}/N_P$ ratio leads to higher power factor but lower efficiency and higher Cb voltage stress. For most practical purposes the overall performance of the converter is deemed optimum when the $N_{P1}/N_P$ ratio is between about ¼ and about ¾, not to exceed four-fifths. When the corresponding winding ratio is ½, the converter of the FIGS. 5A and 5B waveforms can provide a power factor of about 0.9 and very good efficiency, while keeping Cb voltage well below 400 V for universal input.

Figure 6A:
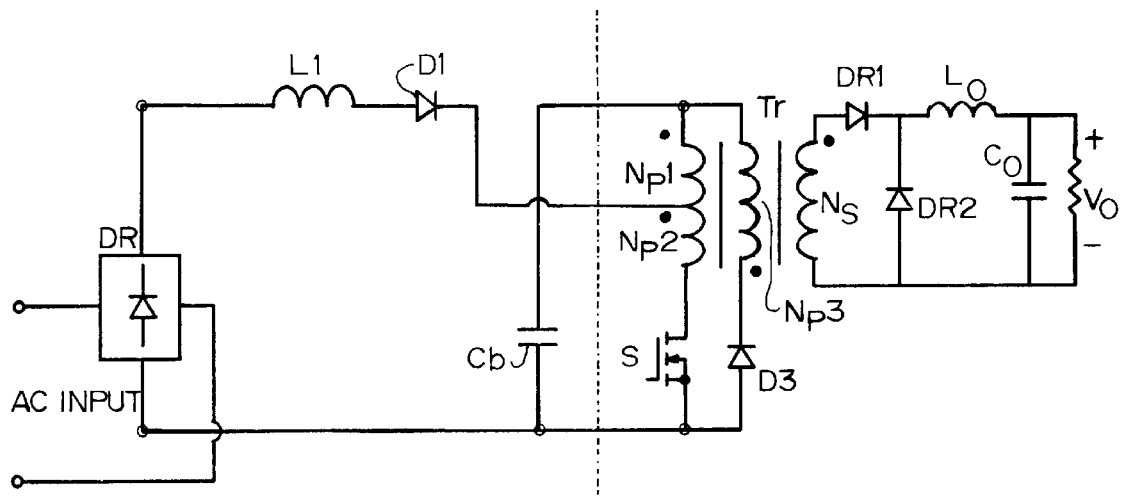
FIG. 6A is a conventional forward converter variant of the FIG. 3A embodiment with a multiple-input-winding transformer.
Figure 6B:
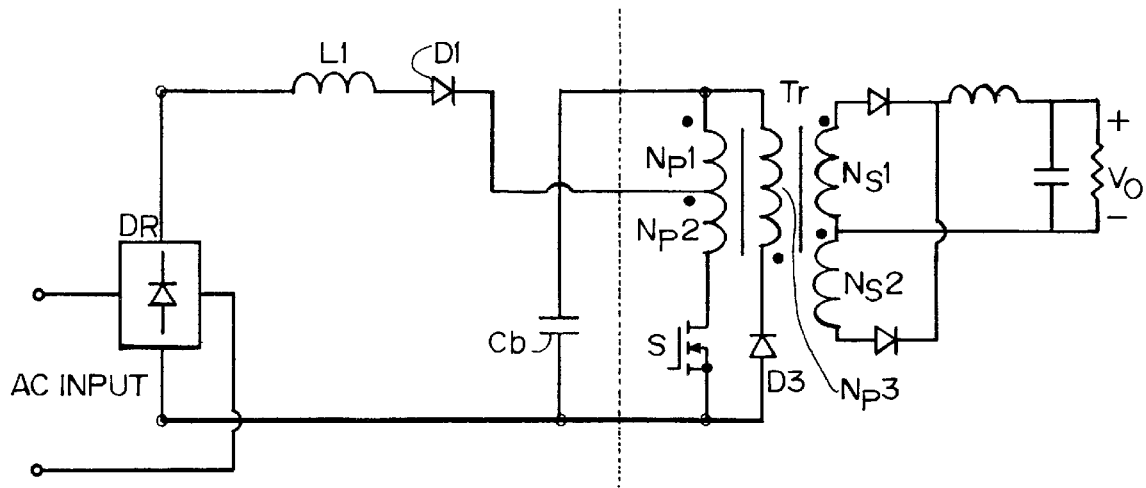
FIG. 6B is a variant of the FIG. 6A forward converter embodiment, wherein the secondary (output) winding is center-tapped.

FIGS. 6A and 6B show schematically, in circuit diagram form, two single-stage forward AC/DC converters embodying this invention likewise but having a transformer with a second primary winding reverse-wound (with $N_{P3}$ turns) for resetting the transformer—without requiring or utilizing another high-frequency switch.

FIG. 6A shows such an embodiment of the present invention with an intermediate tap (optionally a centertap) connection to the primary winding, utilizing customary forward converter circuitry also including a conventional secondary winding with $N_S$ turns.

FIG. 6B shows a similar embodiment with centertapped secondary winding having $N_{S1}$ turns and $N_{S2}$ turns in its respective halves.

Figure 7A:
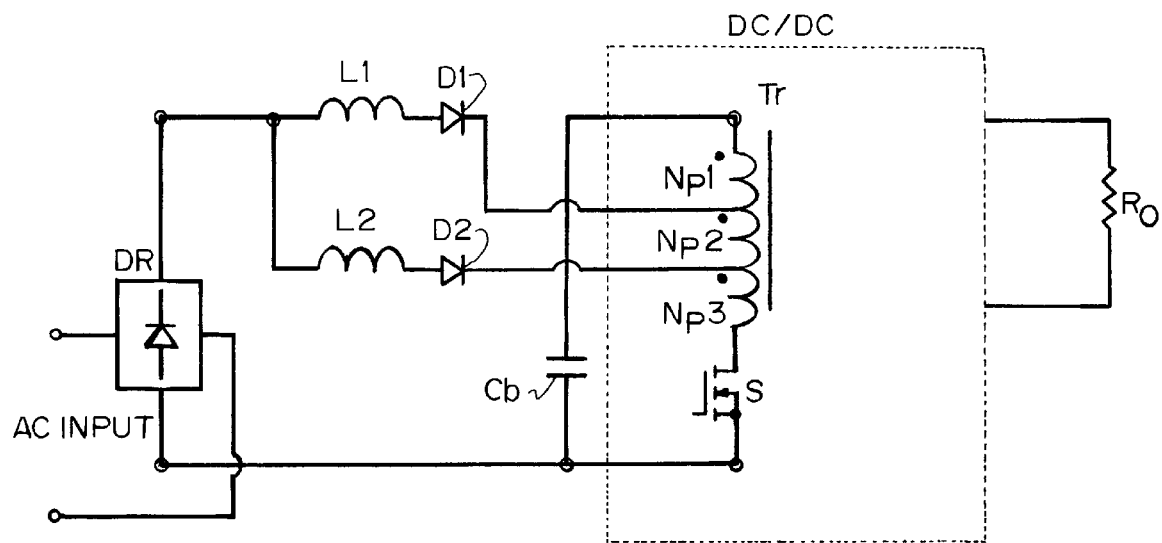
FIG. 7A is a multiple-tap input winding variant of the general FIG. 1 embodiment.

FIG. 7A shows schematically, in like circuit diagram form but generalized by omission of the output circuitry components, a variant of the embodiment of FIG. 2 extended to a double-tapped winding on its transformer. A pair of parallel PFC leads connect respectively to the two (interior) taps. The first such lead includes inductor L1 and diode D1 in series from the positive lead to the first tap (junction of $N_{P1}$ and $N_{P2}$), whereas the second such lead includes inductor L2 and diode D2 in series from the positive lead to the second tap (junction of $N_{P2}$ and $N_{P3}$).

As was noted previously, the selection of a primary windings ratio involves a trade-off between power factor and voltage stress of Cb. However, addition of the second intermediate (or PFC) lead provides a designer with greater flexibility, by enabling L2 to be selected significantly larger than L1 and thereby to achieve close to a power factor of 0.95 while still keeping $V_{Cb}$ below 400 V for universal input applications.

Figure 7B:
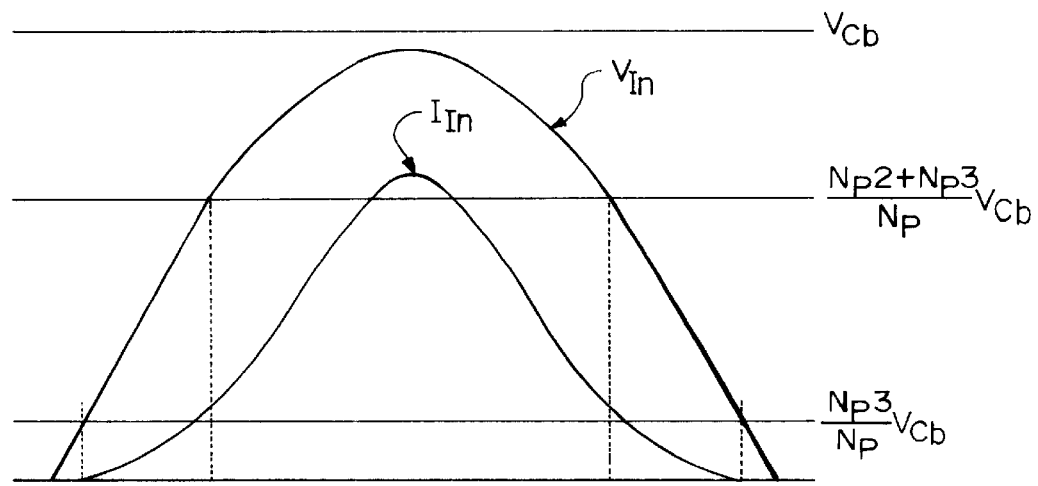
FIG. 7B is a time graph of typical line voltage and average line current waveforms of the FIG. 7A embodiment.

FIG. 7B shows graphically the resulting operation of the power supply of FIG. 7A (much as FIG. 3 did for the apparatus of FIG. 2). For this example, two taps are put at respective junctions of three equal parts of the primary winding of the FIG. 7A embodiment.

Figure 8A:
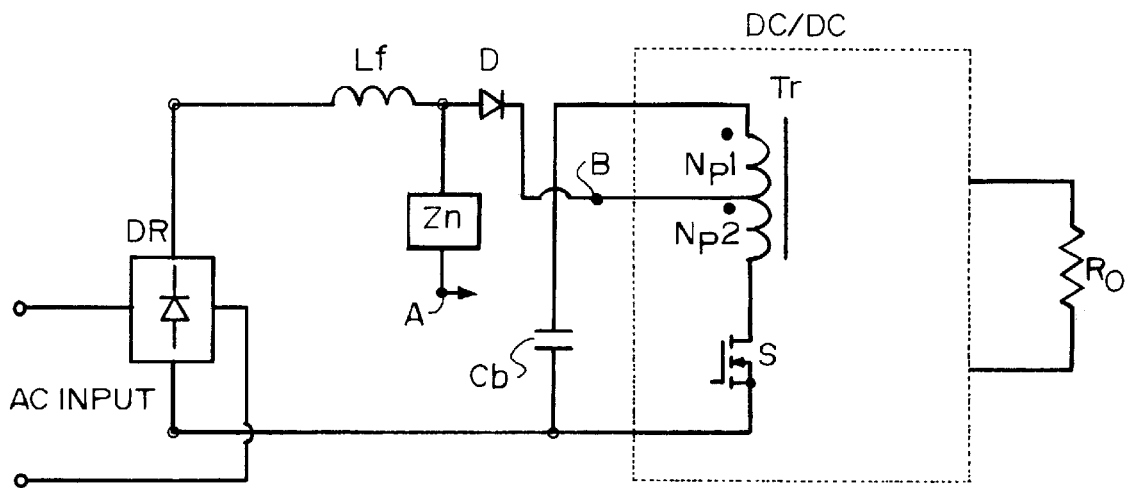
FIG. 8A is a dual PFC lead embodiment with filter inductor (Lf) and generalized lower PFC impedance and transformer connection.

FIG. 8A shows schematically, in circuit diagram form, a dual PFC lead embodiment differing from previous embodiments in having a high-frequency or filter inductor (Lf) present. This showing simply generalizes the impedance of the intermediate (or lower) PFC lead and its transformer connection, as well as the conversion circuitry. Thus, Zn stands for any of various impedance components, such as a capacitor or a diode, either alone or in series with an inductor. It will be understood that node A on that lead (corresponding to node B on the upper PFC lead) is to be extended to the right (arrow) for connection to a node acting as a high-frequency AC source, as at an end (or within) its transformer's primary winding, to which the high-frequency switch is connected.

Figure 8B:
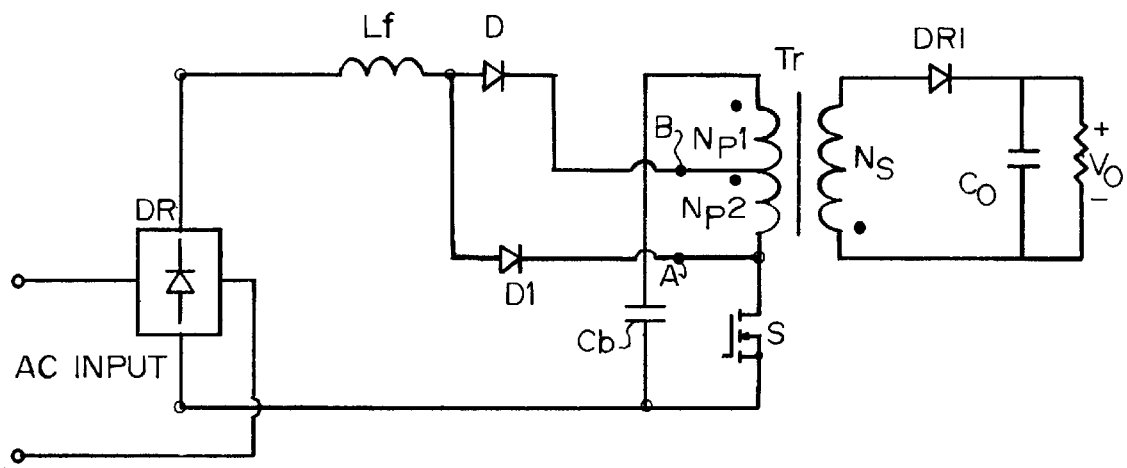
FIG. 8B is a specific flyback converter version of the FIG. 8A embodiment, with the PFC lead particularized as to impedance and transformer connection.

FIG. 8B is a flyback converter example of the more generalized embodiment of FIG. 7B, distinguished by having only diode D1 in the PFC lead to node A—and on to a connection with the junction of high-frequency power switch S and low end of the primary winding. This embodiment exhibits higher efficiency than a predecessor AC/DC converter wherein the other (or higher) PFC lead connects to the high end of the first (or upper) winding of the transformer—instead of tapping thereinto as shown in FIG. 8A and here.

Figure 9A:
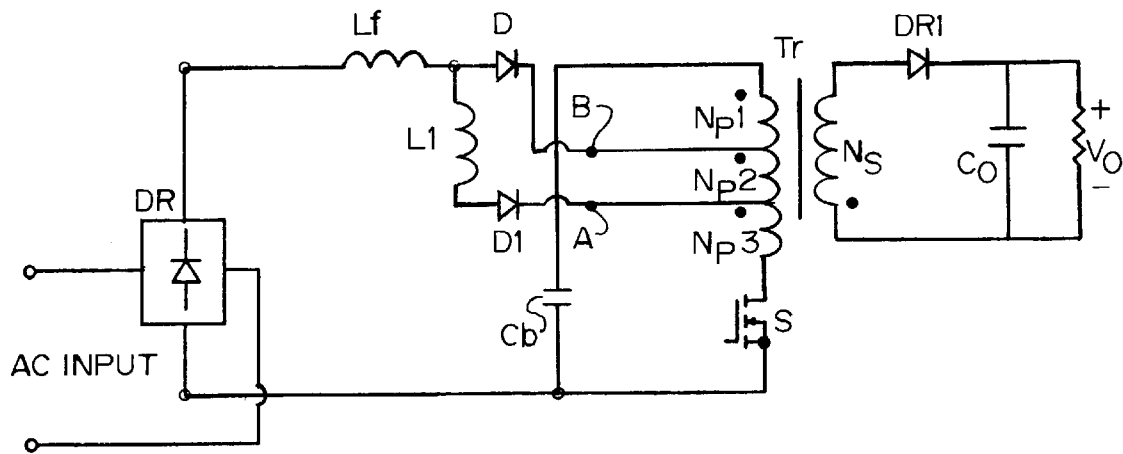
FIG. 9A is a multiple-tap version of such flyback converter.
Figure 9B:
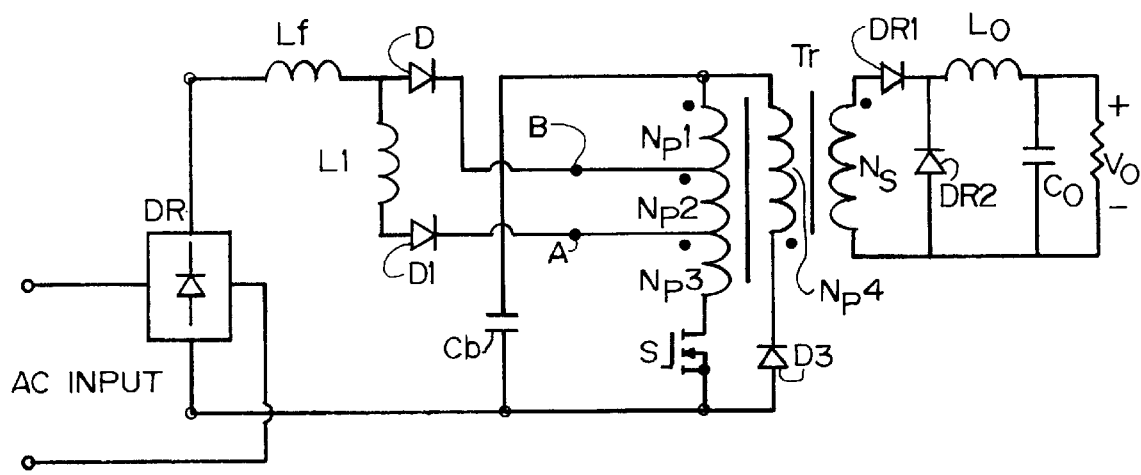
FIG. 9B is a forward converter version otherwise like FIG. 9A.

FIGS. 9A and 9B show schematically, in circuit diagram form, specific embodiments of generalized embodiment 8A of this invention, each with the transformer primary winding having two taps. FIG. 9A illustrates a flyback converter, and FIG. 9B a forward converter. With smoothing inductor Lf present, the upper PFC lead includes diode D on the way to node B—and on to the upper of the two taps, at the junction of winding portions $N_{P1}$ and $N_{P2}$, whereas the lower PFC lead includes both inductor L1 and diode D1 in going to node A. The latter lead goes onward to the other (lower) of the two taps, at the junction of respective winding portions $N_{P2}$ and $N_{P3}$.

As with the converters described above, selection of the L1 and Lf values and the tap locations involves trade-offs, such a between power factor and bulk capacitor voltage stress. For instance, as the L1 inductance decreases, or the tap node A moves lower, power factor increases, but the capacitor stress also increases. In order to improve power factor without overstressing the capacitor voltage, the present invention implements L1 as a non-linear inductor (with varying inductance values, as compared with the unvarying inductance values of a linear inductor. Then at nominal input voltage, L1 preferably has a relatively low inductance commensurate with a good power factor. At high line and light load, where maximum bulk capacitor voltage stress occurs, L1 should have a relatively larger inductance value in order to suppress such capacitor voltage stress. Although the power factor may degrade significantly when the value of L1 inductance increases at high line and light load, PFC is not a prime requisite for most power supplies under such circumstances.

Figure 10A:
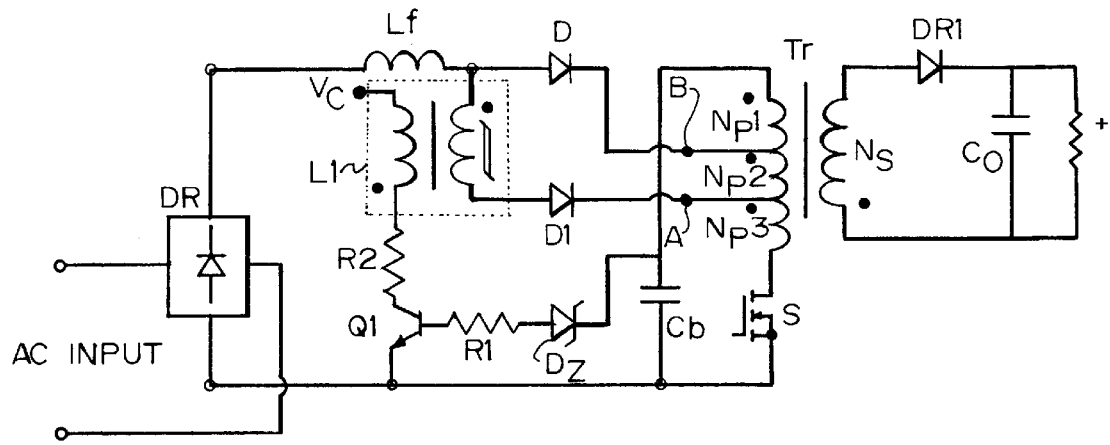
FIG. 10A is a variant of the multiple-tap flyback embodiment of FIG. 9A, including a controllable saturable (non-linear) inductor.
Figure 10B:
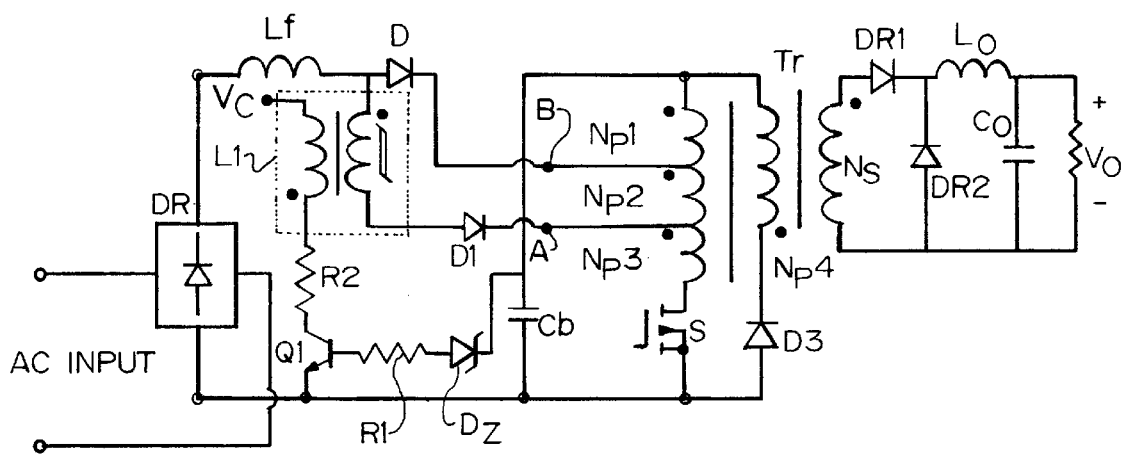
FIG. 10B is a variant of the multiple tap forward embodiment of FIG. 9B, including a controllable saturable (non-linear) inductor.

A simple way of controlling L1 inductance range is to use a series connection of a linear inductor (a minimum inductance value) and a controllable saturable inductor, but FIGS. 10A and 10B illustrate respective flyback and forward converter embodiments using a somewhat simpler implementation: a non-linear inductor, specifically a saturable reactor (magnetic amplifier).

FIGS. 10A and 10B show saturable reactor L1 having a control winding to control its reset current. Vc is the control voltage source, Q1 is a transistor to control the reset current of L1, and Dz is a zener diode that sets the threshold voltage to turn on Q1.

When input voltage is low or load current is heavy, transistor Q1 is off (non-conductive) because the bulk capacitor voltage is too low to turn Q1 on. Once Q1 is turned on, the control winding of L1 starts to provide reset to L1 during the power switch S OFF time. Then L1 becomes unsaturated (with very high inductance value) and can block a certain amount of volt-seconds when S is turned ON again in the next switching cycle. This increases the equivalent inductance of L1 and, thus, can effectively suppress the bulk capacitor voltage stress. Proper selection of Q1 gain and R1, R2 resistor values, can limit the maximum bulk capacitor voltage to a value only slightly higher than the threshold voltage of Dz.

The present invention has been illustrated and described here in embodiments including single-tapped and multi-tapped primary windings of the customary isolation transformer, and with corresponding single and multiple intermediate (conveniently designated here as PFC) leads from the positive rectified AC input.

The invention is adapted to functioning with these converters: boost, buck, buck-boost, Cuk, flyback, forward, SEPIC, and Zeta. Such an adaptation for several of them has been shown and described.

This invention greatly enhances the ability of a power supply designer to optimize a mix of pertinent characteristics, such as number and size of circuit components, power factor, soft-switching, output regulation, overall efficiency (power out/power in), bulk capacitor voltage stress, etc.

The various advantages and benefits of the present invention will become even more apparent to designers undertaking to practice it, and to the purchasers and users of power supplies so designed.

Preferred embodiments and variants have been suggested for this invention. Other modifications may be made, as by adding, combining, deleting, or subdividing components or steps, while retaining all or at least some of the advantages and benefits of the present invention—which itself is defined in the following claims.

I claim:

1. Electrical power supply apparatus in the form of an AC/DC converter having AC-source rectifier circuitry connected by a pair of positive (high) and negative (low) leads to a primary winding of an isolation transformer having a secondary winding connecting by a similar pair of leads across output rectifying circuitry, comprising a bulk (energy-storage) smoothing capacitor connecting across the transformer primary winding (i) by a connection to the high end of the winding, and (ii) by a connection to the low end of the winding via an intervening high-frequency power switch single such switch being required;

the positive input lead being series-connected to the primary winding only via at least one PFC (power factor correction) lead containing a high-frequency inductor and a diode in series connecting to a tap on the primary winding intermediate the ends of the winding.

2. Apparatus according to claim 1, including more than one PFC lead connecting to the transformer primary winding.

3. Apparatus according to claim 2, including more than one intermediate tap on the primary winding, and wherein respective PFC leads connect to respective taps.

4. Apparatus according to claim 1, including a high-frequency inductor in the positive lead to the PFC lead.

5. The apparatus of claim 1, wherein the primary winding tap to which such a PFC lead connects is located at most about four-fifths of the total length of the winding from the low end of the winding.

6. Apparatus improvement in a single-stage AC/DC converter having positive and negative (or neutral) rectified-AC input leads, comprising a PFC (power factor correction) lead from the positive lead to a tap intermediate the ends of a primary winding of an isolation transformer having also a secondary winding across output rectifying circuitry; and an energy-storage smoothing capacitor across the transformer primary winding, connecting to the high end of the winding, and connecting to the low end of the winding via an intervening high-frequency power switch, no high end positive lead connection being present.

7. Apparatus according to claim 6, wherein the winding tap to which a PFC lead connects is located at most about four-fifths of the total length from the low end of the winding.

8. Apparatus improvement according to claim 6, wherein the isolation transformer and high-frequency power switch and output rectifying circuitry are selected from one of the following types: boost, buck, buck-boost, Cuk, flyback, forward, SEPIC, Zeta.

9. Apparatus improvement in a single-stage AC/DC converter having positive and negative (or neutral) rectified-AC input leads to DC/DC conversion circuitry including an isolation transformer having a primary input winding with high and low ends and having also a secondary winding across output rectifying circuitry;

comprising an energy-storage smoothing capacitor across the transformer primary winding, connecting to the high end of the winding, and connecting to the low end of the winding via an intervening high-frequency power switch, only a single such switch being required;

a first PFC (power factor correction) lead from the positive lead via a diode, preferably preceded in series by a high-frequency inductor, to a first tap intermediate the ends of the transformer primary winding; and a second PFC lead from the junction of the high-frequency inductor and the diode to a second tap intermediate the ends of the same transformer primary winding.

10. Apparatus improvement according to claim 9, wherein the first tap is located at most about one-half of the total length of the winding from the high end of the winding, and the second tap is located at most about four-fifths of the total length of the winding from the low end.

11. Apparatus improvement according to claim 9, wherein the second PFC lead contains a high-frequency inductor and diode in series.

12. Apparatus improvement according to claim 11, wherein the high-frequency inductor is a controllable saturable inductor (magnetic amplifier) having a main winding and having also a control winding for controlling resetting of the inductor.

13. Apparatus improvement according to claim 9, wherein the isolation transformer and high-frequency power switch, and output rectifying circuitry are selected from one of the following types: boost, buck, buck-boost, Cuk, flyback, forward, SEPIC, Zeta.

14. Method of controlling operation of an AC/DC converter, for use as a power supply, containing an isolation transformer located between a rectified-AC input via positive and negative (or neutral) leads, and containing DC-conversion output circuitry, comprising the steps of connecting an energy-storage smoothing capacitor across the transformer primary winding, by a connection to the high end of the winding, and by a connection to the low end of the winding via an intervening high-frequency power switch; and providing PFC (power factor correction) by connecting the positive lead only to at least one tap located on the primary winding intermediate its ends and thereby adjusting at least one of the following operational variables, in addition to power factor: capacitor voltage stress, output regulation, overall efficiency.

15. Method according to claim 14, including the step of connecting to a tap nearer (not at) the high end of the primary winding, so increasing overall efficiency at a sacrifice in power factor.

16. Method according to claim 14, including the step of connecting to a tap nearer (not at) the low end of the primary winding, and so improving power factor but at an increase in voltage stress on the smoothing capacitor.

17. Method according to claim 14, including the step of connecting another PFC lead to the primary winding at a tap thereon spaced from such connection of the first PFC lead, and so optimizing power factor, regulation, and efficiency.

18. Method of AC/DC conversion for use as a power supply, comprising the steps of connecting rectified-AC to a first tap on a primary winding of an isolation transformer by
  (i) a positive lead preferably containing a high-frequency inductor and then a steering diode, and
  (ii) a negative (or neutral) lead containing a high-frequency switch to the low end of the winding;

connecting a smoothing capacitor between the negative lead and the high end of the primary winding; and connecting an intermediate or PFC (power factor correction) lead from the junction of the smoothing inductor and the steering diode to a second tap on the primary winding.

19. Method according to claim 18, including the step of selecting the first tap location between the high end and about the center point of the transformer primary winding, and selecting the second tap location at most about four-fifths from the low end of the primary winding.

20. Method according to claim 18, including the step of providing one such PFC lead with a high-frequency inductor, preferably a saturable reactor (magnetic amplifier) and a diode, in series.

21. Method according to claim 18, including the steps of evaluating the effect of tap location upon the values of given variables of AC/DC conversion for electrical power supplies, such as power factor, smoothing capacitor stress, output regulation, and efficiency of operation, and selecting the tap accordingly.

* * * * *

UNITED STATES PATENT AND TRADEMARK OFFICE
CERTIFICATE OF CORRECTION

PATENT NO. : 6,005,780
DATED : 12-21-99
INVENTOR(S) : Guichao HUA

It is certified that error appears in the above-indentified patent and that said Letters Patent is hereby corrected as shown below:

In Claim 1, line 12, as issued, should read as originally filed bridging lines 11 and 12; viz., as follows:

intervening high-frequency power switch, only a single such

Signed and Sealed this

Twenty-seventh Day of March, 2001

Attest:

NICHOLAS P. GODICI

Attesting Officer

Acting Director of the United States Patent and Trademark Office